United States Patent
Hong

(10) Patent No.: US 11,400,667 B2
(45) Date of Patent: Aug. 2, 2022

(54) TIRE MAINTENANCE MEANS

(71) Applicant: ACTIVE TOOLS INTERNATIONAL (HK) LTD., Causeway Bay (HK)

(72) Inventor: Ying Chi David Hong, Hong Kong (CN)

(73) Assignee: ACTIVE TOOLS INTERNATIONAL (HK) LTD., Causeway Bay (HK)

( * ) Notice: Subject to any disclaimer, the term of this patent is extended or adjusted under 35 U.S.C. 154(b) by 225 days.

(21) Appl. No.: 16/470,314

(22) PCT Filed: Dec. 15, 2016

(86) PCT No.: PCT/CN2016/110043
§ 371 (c)(1),
(2) Date: Jun. 17, 2019

(87) PCT Pub. No.: WO2018/107413
PCT Pub. Date: Jun. 21, 2018

(65) Prior Publication Data
US 2020/0009809 A1 Jan. 9, 2020

(51) Int. Cl.
*B29C 73/16* (2006.01)
*B60S 5/00* (2006.01)

(52) U.S. Cl.
CPC .............. *B29C 73/166* (2013.01); *B60S 5/00* (2013.01)

(58) Field of Classification Search
CPC ........ B29C 73/166; B60C 23/02; B60C 23/04
USPC .......................................... 264/36.14; 141/38
See application file for complete search history.

(56) References Cited

U.S. PATENT DOCUMENTS

| | | | |
|---|---|---|---|
| 5,070,917 A | 12/1991 | Ferris et al. | |
| 7,287,565 B2 * | 10/2007 | Hottebart | B60C 23/004 152/416 |
| 7,395,702 B2 * | 7/2008 | Qiu | B60C 23/0494 73/146.8 |
| 7,559,235 B2 * | 7/2009 | Maekawa | B60C 23/0408 340/442 |
| 8,327,897 B2 | 12/2012 | Firestone | |
| 9,162,327 B2 * | 10/2015 | Kliskey | F16K 15/20 |
| 9,409,451 B2 * | 8/2016 | Kanenari | B60C 23/04 |
| 9,434,222 B2 * | 9/2016 | Burlett | B60C 29/005 |
| 9,604,508 B2 * | 3/2017 | Lesesky | B60C 23/0447 |

(Continued)

FOREIGN PATENT DOCUMENTS

CN 1458881 A 11/2003
CN 101821082 A 9/2010
(Continued)

OTHER PUBLICATIONS

European Patent Application No. 16923640, Extended European Search Report, dated Aug. 19, 2020.
(Continued)

*Primary Examiner* — Timothy L Maust
(74) *Attorney, Agent, or Firm* — Marshall, Gerstein & Borun LLP

(57) ABSTRACT

A tire maintenance means (1) is provided, which includes a monitoring module (2) for monitoring the status of a tire; an inflating module (4) for inflating or deflating the tire; a repairing module (5) for filling a sealant to the tire; a control module (3) for maintaining the tire based on a signal from the monitoring module (2). A method of maintaining a tire is also provided.

20 Claims, 3 Drawing Sheets

(56) References Cited

U.S. PATENT DOCUMENTS

| | | | |
|---|---|---|---|
| 2006/0220814 A1* | 10/2006 | Kawashima | B60C 23/0408 340/442 |
| 2007/0171038 A1 | 7/2007 | Maekawa | |
| 2007/0289371 A1* | 12/2007 | Watanabe | B60C 17/00 73/146.3 |
| 2009/0294005 A1 | 12/2009 | Firestone | |
| 2016/0272017 A1* | 9/2016 | Ghannam | G01C 21/00 |
| 2018/0178598 A1* | 6/2018 | Woodley | B60C 23/02 |

FOREIGN PATENT DOCUMENTS

| | | |
|---|---|---|
| CN | 101977755 A | 2/2011 |
| CN | 103003109 A | 3/2013 |
| CN | 203460630 U | 3/2014 |
| CN | 203472437 U | 3/2014 |
| CN | 203500721 U | 3/2014 |
| CN | 103921630 A | 7/2014 |
| CN | 105172491 A | 12/2015 |
| CN | 105722669 A | 6/2016 |
| EP | 1057664 A1 | 12/2000 |
| EP | 1813447 A2 | 8/2007 |
| JP | S57-158108 A | 9/1982 |
| JP | H04321405 A | 11/1992 |
| JP | H07069017 A | 3/1995 |
| JP | H09118779 A | 5/1997 |
| JP | 2001212883 A | 8/2001 |
| JP | 2006-281977 A | 10/2006 |
| JP | 2009-184461 A | 8/2009 |
| JP | 3198528 U | 7/2015 |
| JP | 2016-525974 A | 9/2016 |
| WO | WO-2008/142679 A2 | 11/2008 |
| WO | WO-2016/178137 A1 | 11/2016 |

OTHER PUBLICATIONS

International Application No. PCT/CN2016/110043, International Search Report, dated Sep. 6, 2017.

International Application No. PCT/CN2016/110043, International Preliminary Report on Patentability, dated Mar. 22, 2019.

Japanese Patent Application No. 2019-532704, Notice of Reasons for Refusal, dated Nov. 4, 2020.

Chinese Patent Application No. 201680092091.3, Office Action and Search Report, dated Nov. 23, 2020.

Chinese Patent Application No. 201680092091.3, Office Action, dated Jul. 13, 2021.

Japanese Patent Application No. 2019-532704, Notice of Reasons for Refusal, dated May 18, 2021.

\* cited by examiner

| Spike | Pressure Drop (bar) | | |
|---|---|---|---|
| | 10 seconds | 20 seconds | 30 seconds |
| 2mm | 0.01 | 0.03 | 0.04 |
| 3mm | 0.08 | 0.14 | 0.20 |
| 4mm | 0.15 | 0.26 | 0.35 |
| 6mm | 0.20 | 0.34 | 0.44 |
| 8mm | 0.23 | 0.34 | 0.45 |

TIRE MAINTENANCE MEANS

TECHNICAL FIELD

The present application relates to a tire maintenance means, in particular, an integrated tire maintenance means which can automatically or manfully detect, inflate or repair a tire.

BACKGROUND OF THE INVENTION

A tire plays a significant role during the operation of a device using the tire, such as a vehicle. However, a tire may malfunction during operation, for example, leakage, breakage and/or wear may occur. The malfunction of the tire would significantly affect the safe operation of the device, in particular it would be dangerous for a running vehicle. In the prior art, a detecting system, e.g. TPMs is provided to monitor the status of a tire. The detecting system can monitor the pressure of the tire in real time. It can provide a signal or alarm to the user if the monitored pressure is abnormal. Tire repairing means is also provided in the art. The user can use the tire repairing means to repair a tire when he/she finds the tire is broken and leakage occurs. However, the user needs to determine the status of the tire before using the tire repairing means. In some situation, the user may need to manually inflate the tire after repairing the tire. These steps are not convenient for a user.

Some tire maintenance assemblies are provided in the art, but the operation thereof is quite complex. A user has to learn hard or be trained to learn the operation of the assemblies. Sometimes a user may not properly use the tire maintenance assembly and fails to repair a tire. This improper use may lead to a safety risk to the user.

Therefore, there is a need to provide a more convenient, and intelligent tire maintenance means.

SUMMARY OF THE INVENTION

The present application provides a tire maintenance means which, upon being connected to a tire, can automatically detect whether the tire needs to be inflated, deflated or repaired, such that automatic maintenance for a tire can be achieved.

In an embodiment of the present application, a tire maintenance means is provided, comprising: a monitoring module for monitoring the status of a tire, the status including a pressure of the tire; an inflating module for inflating or deflating the tire; a repairing module for filling a sealant to the tire; and a control module for maintaining the tire based on a signal from the monitoring module.

In another embodiment of the present application, the signal includes a pressure signal indicating the pressure of the tire, and the control module controls the inflating module to inflate the tire when the pressure is lower than a threshold pressure.

In another embodiment of the present application, the control module controls the inflating module to deflate the tire when the pressure is larger than a threshold pressure.

In another embodiment of the present application, the inflating module includes a releasing means which will be activated to deflate the tire when the pressure is larger than a threshold pressure.

In another embodiment of the present application, the releasing means is a closed pressure valve which will open when the pressure is larger than a threshold pressure.

In another embodiment of the present application, the control module further determines whether the tire has a puncture, and when the puncture is determined, the control module controls the repairing module to repair the tire.

In another embodiment of the present application, determining whether the tire has a puncture is based on the variation of the pressure of the tire and/or status of a pump in the inflating module.

In another embodiment of the present application, the control module further determines a leakage level of the tire based on a register table mapping a leakage amount and the leakage level.

In another embodiment of the present application, the control module further determines whether the tire has been successfully repaired.

In another embodiment of the present application, the tire maintenance means further comprises a display module for displaying the status of the tire.

In another embodiment of the present application, the tire maintenance means further comprises a connection tube for connecting with a valve core of the tire, and a sensor is provided within the connection tube or the valve core for measuring the pressure.

In another embodiment of the present application, a valve is provided near an end of the connection tube for selectively communicating an inner of the tire with the tire maintenance means.

The present application further provides a method of maintaining a tire, comprising: providing a tire maintenance means which includes a control module which automatically determines an action to the tire, the action is selected from inflation, deflation and/or filling sealant.

In another embodiment of the present application, the control module maintains the tire by controlling an inflating module and/or a repairing module based on a signal of a monitoring module.

In another embodiment of the present application, the monitoring module monitors the status of the tire which includes pressure of the tire.

In another embodiment of the present application, the tire is inflated or deflated by the inflating module.

In another embodiment of the present application, the repairing module is used to fill a sealant into the tire.

In another embodiment of the present application, the method further comprises a step of determining whether the tire has a puncture by the control module, based on a variation of the pressure in the tire and/or the operation of a pump in the inflating module.

In another embodiment of the present application, the control module further determines the leakage level of the tire in accordance to an index table mapping leakage amounts/unit time and spike sizes.

THE BRIEF DESCRIPTION OF THE DRAWINGS

DETAILED EMBODIMENTS

Though the drawings show embodiments of the present application, one skilled in the art would understand that the scope of the present invention should not be limited to the drawings. Various modifications are possible with the teaching of the present invention, which modifications should be within the scope of the present invention.

Figures 1, 2:
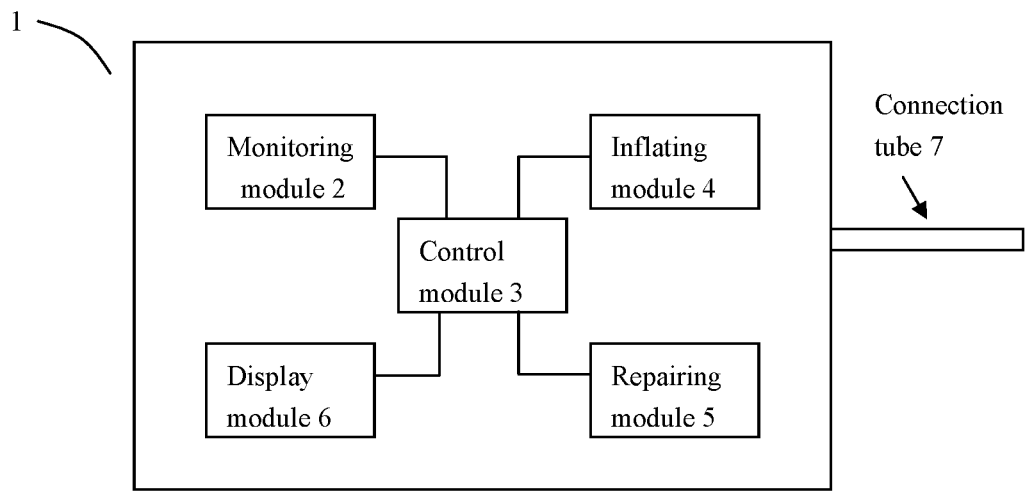
FIG. 1 is an embodiment of the tire maintenance means shown in an illustrative view.
FIG. 2 is a table showing the pressure changes when spikes of different sizes are occurred in a tire.

FIG. 1 is an illustrative view of the tire maintenance means of the present application. The tire maintenance means 1 can include a monitoring module 2, a control module 3, an inflating module 4 and a repairing module 5. The tire maintenance means 1 may also include a display module 6. The monitoring module 2 is used to monitor the status of the tire, including but not limited to inner pressure of the tire. The monitoring module 2 will transmit signals regarding the pressure to the control module 3. The control module 3 controls the inflating module 4, the repairing module 5 and/or the display module 6 according to the signal. All these modules can be arranged within a housing such that a compact design can be achieved. A connecting tube 7 is provided to connect the tire maintenance means to a tire. Thus, when a user connects the tire maintenance means to a tire, the means will maintain the tire automatically.

Taking a tire for a car for example, the normal pressure of the tire is about 2.5 bar. Therefore, the threshold value for the tire would be 2.5 bar. The abnormal state of the tire can be determined by comparing the pressure of the tire to the threshold value. It can be appreciated that the normal pressure would be different for a tire using in different situation. Therefore, the threshold value can be changed depending on the usage of the tire. In one embodiment, the tire maintenance means allows a user to select a type of the vehicle in which the tire is used. The control means then determines the threshold based on the selection. In an advance mode, the user is allowed to input a threshold into the tire maintenance means. The following explanation will take the tire for a car for example.

When the tire maintenance means is connected to a tire, the monitoring module will monitor the pressure of the tire. If the pressure is beyond 2.5 bar, the inflating module will deflate the tire until the pressure lowers to 2.5 bar. The inflating module includes a releasing means which will be activated to deflate the tire when the pressure is larger than the threshold pressure, i.e. 2.5 bar in this embodiment. If the detected pressure is lower than the threshold pressure, the control module will activate the inflating module to inflate the tire until the pressure within the tire reaches 2.5 bar. The control module also determines whether the tire has a puncture in accordance to the pressure variation of the tire. If a puncture is determined, the control module will control the repairing module to repair the tire.

Next the modules will be described in more details.

Monitoring Module 2

The monitoring module 2 can include electronic device, mechanical device and/or chemical means for detecting the pressure of the tire. In one embodiment, the end portion of the connecting tube or a valve core is provided with a pressure sensor. The pressure sensor can be arranged at other position, for example within the housing of the tire maintenance means, as long as the pressure sensor can detect the pressure of the tire. Upon connecting the tube to a tire, the tire will fluidly communicate with the tire so that the pressure sensor will continually detect the inner pressure of the tire in a predetermined interval. The detected pressure values are sent to the control module. It can be appreciated that the pressure sensor can be an electronic sensor, a mechanical sensor or even a smart chemical coating.

The monitoring module 2 can provide with a transmitting module, e.g. RFID module. Some tires have equipped with a tire pressure monitoring system (TPMs). In this case, the monitoring module 2 can communicate with the TPMs via RFID to attain the pressure of the tire.

Control Module 3

The control module 3 is connected to the other modules. The monitoring module 2 provides signals to the control module 3. The signals comprise pressure signals. A status of the tire will be determined by the control module 3 based on the signal, such as over pressure state, low pressure state, or puncture state. For example, regarding a tire for a car, the normal pressure is about 2.5 bar. Therefore, the threshold value is set to be 2.5 bar. As discussed above, the threshold value can be varied depending on the type of the tire. If the detected pressure is over 2.5 bar, the control module will control the inflating module to deflate the tire until the pressure of the tire is reduced to 2.5 bar.

Alternatively, this deflation can be accomplished by the inflating module independent of the control module. For example, the inflating module includes a closed pressure valve which is closed in normal state but will open when the pressure is over 2.5 bar. Therefore, if the tire pressure is beyond 2.5 bar, the closed pressure valve will automatically open to release the air within the tire.

If the pressure of the tire is lower than 2.5 bar, the control module 3 will activate the inflating module to inflate the tire until the pressure within the tire reaches 2.5 bar. One skilled in the art would understand that the inflating module includes a pump for pumping air into the tire. If the tire does not have a puncture, the pressure within the tire will not change after the inflation. Therefore, if a pressure drop is detected after the inflation, the control module 3 can determine that there is a puncture in the tire. Preferably, depending on the leakage amount, the control module can further determine the leakage level of the tire. The leakage amount can be calculated by the pressure drop per unit time.

FIG. 2 shows the data regarding pressure changes during a spike test of a tire. In this example, the sample tire has a volume of about 41 liters. Several sizes of spikes have been tested. At the beginning, the tire is in good condition and does not have any puncture. Then different sizes of the spikes are formed in the tire. For example, a spike of about 2 mm diameter is formed in the tire. The pressure in the tire drops 0.01 bar in 10 seconds, drops 0.03 bar in 20 seconds, and drops 0.04 bar in 30 seconds. For a spike of about 3 mm diameter, the pressure in the tire drops 0.08 bar in 10 seconds, drops 0.14 bar in 20 seconds, and drops 0.20 bar in 30 seconds. For a spike of about 4 mm diameter, the pressure in the tire drops 0.15 bar in 10 seconds, drops 0.26 bar in 20 seconds, and drops 0.35 bar in 30 seconds. For a spike of about 6 mm diameter, the pressure in the tire drops 0.20 bar in 10 seconds, drops 0.34 bar in 20 seconds, and drops 0.44 bar in 30 seconds. For a spike of about 8 mm diameter, the pressure in the tire drops 0.23 bar in 10 seconds, drops 0.34 bar in 20 seconds, and drops 0.45 bar in 30 seconds.

Therefore, for a specific type of tire, it is possible to approximately determine the spike size based on the detected pressure drop in a predetermined time period. Thus, based on experiment data, index tables for specific types of tires regarding the leakage amount and the spike size can be generated and stored in the control module. The control module will use the index tables to determine, when a puncture is detected, the spike size in the tire. Thus, a repairing strategy can be determined by the control module based on the spike size. For example, the control system may determine the amount of the sealant to be injected into the tire. If the spike size is too large to be repaired by injecting sealant, the control module can give out a signal for replacing the tire.

Besides determining the spike size by the pressure variation, it is possible to determine the spike size by monitoring the operation of the pump in the inflation module. Generally, when inflating the tire, the control module will stop the operation of the inflating module when the pressure in the tire has reached the threshold value, e.g. 2.5 bar. For a tire which does not have a puncture, the pump in the inflating module will stop operation. For a tire which has a puncture, the tire pressure will drop due to the puncture, for example drop to 2.4 bar in ten seconds. The control module then has to start the operation of the inflating module to inflate the tire until the tire pressure reaches 2.5 bar. This cycle will continue if the tire is not repaired. Therefore, by detecting the active status of the pump, it can be determined that whether the tire has a puncture or not.

Alternatively, the puncture can be determined by comparing the pumped air amount by the inflating module and the required amount for inflating the tire. For a given tire having a specific volume, the required air amount for inflating the tire from a detected pressure to a threshold pressure can be calculated before the inflating module starts to inflate the tire. Upon starting the inflating module, the air amount pumped by the inflating module in a time period can be calculated. Therefore, the difference between the required air amount and the pumped air amount can be used to determine whether there is a puncture in the tire and also the size of the spike in the tire. For example, it requires 5 minutes to inflate an empty 41L tire to 2.5 bar with no puncture. Therefore, if the time to inflate the tire to 2.5 bar is higher than 5 minutes, it can be determined that the tire has a leakage, e.g. the tire has a puncture. The time difference can be used for calculating the size of spike.

Figure 3:
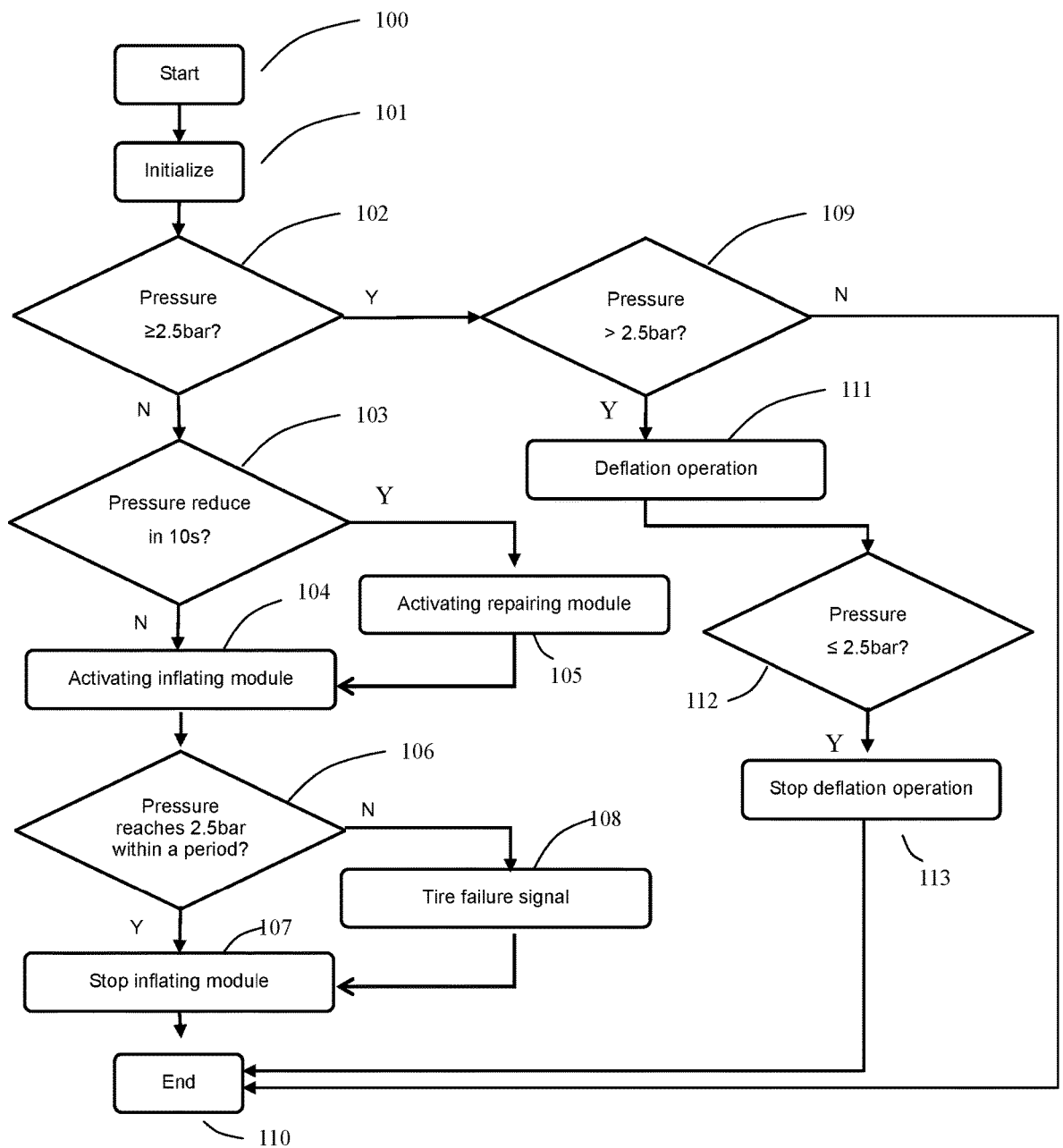
FIG. 3 is a logical diagram of an embodiment of the control module.

FIG. 3 is a logical diagram of the control module. In step 100, the module is activated when the tire maintenance means is started. The means will initialize in step 101, in which the control module can determine whether the other modules are in proper condition. If abnormal condition is detected, the control module can give a corresponding indication. For example, if no sealant bottle is installed in the tire repairing unit, the control module can give an instruction or indication through the display module to the user. Upon connecting the tire maintenance means to a tire, the control module will move to step 102.

The pressure of the tire will be detected and transmitted to the control module. A signal regarding the pressure of the tire can be generated using different methods. For example, for a tire having a TPM system, the pressure sensor has been mounted to a tire, and the information regarding the pressure can be transmitted through a wireless transmitter. Therefore, the tire maintenance means can communicate with the wireless transmitter, e.g. through RFID, to attain the information regarding the pressure. In case the TPMs data is not preferred, or the tire does not have a TPMs system, the pressure of the tire can be detected by the sensors of the tire maintenance means. The sensors are included in the monitoring module. After connecting the connecting tube with the tire, the sensors can detect the pressure of the tire, and the measured values will be transmitted to the control module.

In step 102, the control module makes a comparison to the detected pressure and the threshold value. In this embodiment, the threshold value is 2.5 bar. It can be appreciated that the threshold value can be varied depending on the tire type and/or different applications. Preferably, a control panel is provided such that the user can input or select an appropriate threshold value. If the tire pressure is larger or equal to the threshold value, the control module will proceed to step 109, otherwise the control module will proceed to step 103.

The control module determines whether the tire pressure is larger than the threshold pressure in step 109. If the tire pressure is larger than the threshold pressure, a deflation operation to the tire is needed. In this connection, step 111 is performed. If the tire pressure equals to the threshold pressure, it indicates that the tire is in good condition and the tire maintenance module will proceed to step 110.

Step 111 is a deflation operation. The air in the tire can be discharged to the environment through a valve in the tire maintenance means. The valve can be a pressure valve which is normally closed. The valve is connected to the connecting tube and can be activated by the control module to open. Therefore, in step 111, the control module activates the valve such that the air in the tire can be released. When the pressure in the tire reaches 2.5 bar, i.e. step 112, the valve will be closed, i.e. step 113.

In another embodiment, the valve can be a pressure relief valve which will be opened automatically when the pressure is above a threshold, for example 2.5 bar. The pressure relief valve can be the types known in the art. In this connection, when the connecting tube is connected to the tire having a pressure over the threshold pressure, the valve will open automatically to deflate the tire. In this connection, the deflation operation may not need the involvement of the control module.

If the tire pressure is less than the threshold pressure in step 102, step 103 will take place. In step 103, it will be determined whether there is a puncture such as a spike in the tire. As discussed above, a spike in the tire can be determined by detecting the pressure variation within a predetermined time period. In this embodiment, the predetermined time period is 10 seconds. If a pressure drop is detected within 10 seconds, the tire will be determined to have a puncture. The leakage level will be determined according to the index table. If the tire is found to have a puncture, the control module will activate the repairing module in step 105 to inject sealant into the tire. Then, the control module will move to step 104. If no puncture is determined in the tire, the control module will directly move to step 104.

In step 104, inflation operation is performed to inflate the tire. The tire will be inflated to the threshold pressure, e.g. 2.5 bar. Step 106 will determine whether the inflation is completed. If the pressure has reached 2.5 bar, the control module will stop the inflation module in step 107. However, if the tire pressure can not reach 2.5 bar in a predetermined time period, it may indicate that the tire has not been successfully repaired. The predetermined time period can be for example 20 minutes. It can be appreciated that the predetermined time period will be determined by the volume of the tire and the power of the pump in the inflating module. The failure would happen when the puncture in the tire is too large to be repaired by injecting sealant. In this case, the control module will give out a tire failure signal and a tire replacement would be needed in step 108.

Optionally, the control module can move to step 102 after step 107 to ensure whether the tire is in good condition.

Inflating Module

The inflating module 4 comprises a pump which is connected to the connecting tube 7. When the pump is activated, compressed air will be generated so as to inflate the tire. The inflating module also includes a deflation means, e.g. a valve as discussed above. The air in the tire can be released from the valve if necessary.

Repairing Module

The repairing module 5 comprises a sealant bottle and a pump. The pump can be the same pump in the inflating module. The sealant bottle has an inlet and an outlet. During repairing, the pump will input compressed air into the sealant bottle via the inlet, and the sealant will be discharged via the outlet into a tire.

Figure 4:
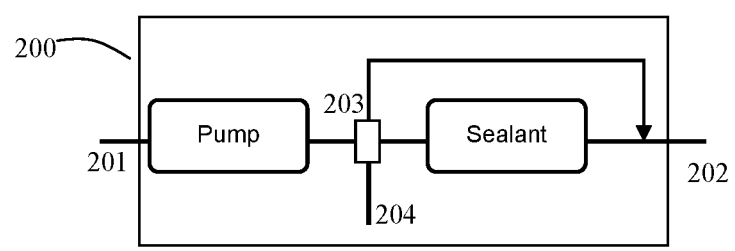
FIG. 4 shows an embodiment of the inflation module and the repairing module of the present application.

The inflating module 4 and the repairing module 5 can be integrated into one module 200 which includes an inlet 201 and an outlet 202. As shown in FIG. 4, it comprises a pump, a sealant bottle and a 3-way solenoid valve 203. The solenoid valve is controlled by the control module such that the module 200 can act as the inflating module or a repairing module. When the pump is connected with the sealant bottle, the module 200 is a repairing module. When the sealant bottle is bypassed, the module 200 is an inflating module. A relief port 204 can be provided so that the module 200 can be used for deflation when the outlet 202 is communicated with the relief port 204.

Display Module 6

The display module is provided to display the status of the means and the tire. For example, the display module may include a display which can show real-time pressure and real-time temperature of the tire. The status such as inflating operation, repairing operation, etc. can be displayed. The display module may include alarm light to indicate the abnormal condition of the tire and/or the tire maintenance means. Sound alarm means can also be adapted.

Connecting Tube

The connecting tube can be a common tube available in the art.

Figure 5:
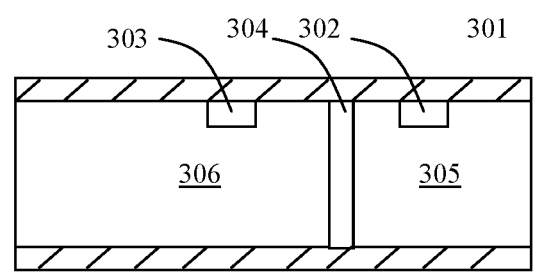
FIG. 5 is an embodiment of the end of the connection tube.

Nonetheless, FIG. 5 is an improved embodiment of the connecting tube, which is used for explanation purpose and serves no purpose for limitation.

FIG. 5 is a sectional view of an end portion of the connecting tube. The end portion 301 will be connected to a valve core of the tire using the methods known in the art, for example using thread connection (not shown). A solenoid valve 304 is provided in the tube, which is used to separate a left side 306 and a second side 305. The solenoid valve is a normally closed valve. The second side 305 will be connected to the tire. A sensor 302 is provided at the second side 305. Therefore, when the connecting tube is connected to the tire, the second side 305 is communicated with the tire. Thus the sensor 302 can detect the pressure in the tire. With this method, the release of the air from the tire will be minimized.

If the pressure detected by the sensor 302 is smaller or larger than the threshold pressure, the control module will activate the solenoid valve 304 to open the solenoid valve 304 such that the tire maintenance means is communicated with the tire. Thus, inflation, deflation and/or repairing steps can be taken. Optionally, another pressure sensor 303 is provided at the left side 306 such that the solenoid valve 304 is activated when the left side pressure substantially equals to the right side pressure, which can avoid the impingement to the tire maintenance means.

In an embodiment of the present application, the tire maintenance means provides several different operation modes to the user, such as automatic mode, guidance mode or manual mode, such that the user can make a selection. In the automatic mode, the tire maintenance means will automatically finish the maintenance to the tire. The user only needs to connect the connecting tube to a valve core of a tire, and the tire maintenance means will automatically detect the pressure of the tire and corresponding actions will be taken. It can be appreciated that the tire maintenance means can be operated by a battery, or the electricity generated by a car, or even by a power grid. In the guidance mode, the control module will give out selections to the user, e.g. through the display module, and guides the user to finish the maintenance. In the manual mode, the user can select a step, such as inflation step, deflation step, repairing step. It would be advantageous to an experienced user which may directly perform the repairing step, i.e. step 105, if he/she determines a puncture in the tire.

In an embodiment of the present application, the tire maintenance means can include a client application which can be installed in a small mobile phone/pad. In this connection, the tire maintenance means will be provided with wireless connection module, such as WIFI or Bluetooth, such that the small mobile phone or pad can be communicated with and/or control the tire maintenance means.

The present application also provides a method of automatically maintaining a tire. First, the pressure of a tire is detected. The detection can be performed by a sensor integrated in the tire or a sensor connected to the tire. The status of the tire is determined based on the detected values: if the pressure is over the threshold pressure, deflation operation will be performed so that the pressure in the tire will become proper; if the tire is under the threshold pressure, inflation operation is performed; if the tire has a puncture, sealant will be injected into the tire to repair the tire. In a preferred embodiment of the present application, it further includes a step of determining whether the tire has been successfully repaired. If the tire has not been repaired, a failure signal can be given or another attempt for repairing may be performed.

While the above detailed description has shown, described, and pointed out novel features as applied to various embodiments, it will be understood that various omissions, substitutions, and changes in the form and details of the device or process illustrated may be made without departing from the spirit of the disclosure. Additionally, the various features and processes described above may be used independently of one another, or may be combined in various ways. All possible combinations and subcombinations are intended to fall within the scope of this disclosure. Many of the embodiments described above include similar components, and as such, these similar components can be interchanged in different embodiments.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

The invention claimed is:

1. A tire maintenance system, comprising:
   a monitoring module, including one or more sensors, for monitoring the status of a tire, the status including a pressure of the tire;
   an inflating module, including a pump, for inflating or deflating the tire;
   a repairing module, including a sealant bottle, for filling a sealant to the tire;
   a controller for maintaining the tire based on a signal from the monitoring module, configured to automatically determine an action to perform upon the tire, wherein the action is selected from inflation, deflation, and/or filling sealant; and a connecting tube to connect the tire maintenance system to the tire, wherein the tire maintenance system further comprises an automatic mode, a guidance mode or a manual mode, wherein in the automatic mode, the tire maintenance system will automatically finish the maintenance to the tire, wherein in the guidance mode, the controller provides selections to the user through the display, and guides the user to finish the maintenance, and wherein in the manual mode, the user can select an individual step, including an inflation step, a deflation step, or a repairing step.

2. The tire maintenance system according to claim 1, wherein the signal includes a pressure signal indicating the pressure of the tire, the controller controls the inflating module to inflate the tire when the pressure is lower than a threshold pressure.

3. The tire maintenance system according to claim 2, wherein the controller controls the inflating module to deflate the tire when the pressure is larger than a threshold pressure.

4. The tire maintenance system according to claim 2, the inflating module includes a releasing means which will be activated to deflate the tire when the pressure is larger than a threshold pressure.

5. The tire maintenance system according to claim 4, wherein the releasing means is a closed pressure valve which will open when the pressure is larger than a threshold pressure.

6. The tire maintenance system according to claim 2, wherein the controller further determines whether the tire has a puncture, when puncture is determined, the controller controls the repairing module to repair the tire.

7. The tire maintenance system according to claim 6, wherein determining whether the tire has puncture is based on the variation of the pressure of the tire and/or status of a pump in the inflating module.

8. The tire maintenance system according to claim 6, wherein the controller further determines the leakage level of the tire based on a register table mapping a leakage amount and a leakage level.

9. The tire maintenance system according to claim 6, wherein the controller further determines whether the tire has been successfully repaired.

10. The tire maintenance system according to claim 1, further comprises a display for displaying the status of the tire.

11. The tire maintenance system according to claim 1, further comprises a connection tube for connecting with a valve core of the tire, a sensor is provided within the connection tube or the valve core for measuring the pressure.

12. The tire maintenance system according to claim 11, wherein the valve is provided near an end of the connection tube for selectively communicating with an interior of the tire with the tire maintenance system.

13. The tire maintenance system according to claim 1, further comprises a wireless connection module for communicating with a smart mobile phone or pad, whereby the tire maintenance system can be controlled by the smart mobile phone or pad.

14. A method of maintaining a tire, comprising:
providing a tire maintenance system which includes:
a monitoring module, including one or more sensors, for monitoring the status of a tire, the status including a pressure of the tire;
an inflating module, including a pump, for inflating or deflating the tire;
a repairing module, including a sealant bottle, for filling a sealant to the tire; and
a controller, wherein the controller maintains the tire by controlling an inflating module and/or a repairing module based on a signal of a monitoring module,
wherein the tire maintenance system further comprises an automatic mode, a guidance mode or a manual mode, wherein in the automatic mode, the tire maintenance system will automatically finish the maintenance to the tire, wherein in the guidance mode, the controller provides selections to the user through the display, and guides the user to finish the maintenance, and wherein in the manual mode, the user can select an individual step, including an inflation step, a deflation step, or a repairing step; and
connecting the tire maintenance system to the tire via a connecting tube; wherein the controller automatically determines an action to perform upon the tire, the action being selected from inflation, deflation and/or filling sealant.

15. The method of maintaining a tire according to claim 14, wherein the monitoring module monitors the status of the tire, including pressure of the tire.

16. The method of maintaining a tire according to claim 14, wherein the tire is inflated or deflated by the inflating module.

17. The method of maintaining a tire according to claim 14, wherein the repairing module is used to fill a sealant into the tire.

18. The method of maintaining a tire according to claim 14, further comprising a step of determining whether the tire has puncture by the controller, based on a variation of the pressure in the tire and/or the operation of a pump in the inflating module.

19. The method of maintaining a tire according to claim 14, wherein the controller further determines the leakage level of the tire in accordance to an index table mapping leakage amounts/unit time and spike sizes.

20. The method of maintaining a tire according to claim 14, wherein the tire maintenance system further comprises a wireless connection module for communicating with a smart mobile phone or pad, whereby the tire maintenance system can be controlled by the smart mobile phone or pad.

* * * * *